United States Patent
Moeglein

(10) Patent No.: US 9,049,560 B2
(45) Date of Patent: *Jun. 2, 2015

(54) PROVIDING WIRELESS TRANSMITTER ALMANAC INFORMATION TO A MOBILE STATION BASED ON EXPECTED CONTRIBUTION TO FUTURE NAVIGATION OPERATION

(71) Applicant: QUALCOMM Incorporated, San Diego, CA (US)

(72) Inventor: Mark L. Moeglein, Ashland, OR (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/105,132

(22) Filed: Dec. 12, 2013

(65) Prior Publication Data

US 2014/0179355 A1 Jun. 26, 2014

Related U.S. Application Data

(63) Continuation of application No. 13/046,542, filed on Mar. 11, 2011, now Pat. No. 8,634,850.

(51) Int. Cl.
| | | |
|---|---|---|
| *H04W 24/00* | (2009.01) | |
| *H04W 4/02* | (2009.01) | |
| *G01S 5/02* | (2010.01) | |
| *G01S 19/46* | (2010.01) | |

(52) U.S. Cl.
CPC ............. *H04W 4/028* (2013.01); *G01S 5/0236* (2013.01); *G01S 19/46* (2013.01)

(58) Field of Classification Search
CPC ....... H04W 4/028; G01S 5/0236; G01S 19/46
USPC ......... 455/403–404.1, 456.1–456.6; 370/328, 370/338
See application file for complete search history.

(56) References Cited

U.S. PATENT DOCUMENTS

| | | | |
|---|---|---|---|
| 6,721,567 | B1 | 4/2004 | Wang et al. |
| 7,257,413 | B2 | 8/2007 | Sheynblat |
| 8,634,850 | B2 | 1/2014 | Moeglein |
| 2004/0203779 | A1 | 10/2004 | Gabara et al. |
| 2005/0090266 | A1 | 4/2005 | Sheynblat |
| 2005/0148346 | A1 | 7/2005 | Maloney et al. |
| 2007/0225016 | A1 * | 9/2007 | Jendbro et al. ............. 455/456.1 |
| 2009/0058720 | A1 | 3/2009 | Shaw et al. |

(Continued)

FOREIGN PATENT DOCUMENTS

| | | |
|---|---|---|
| JP | 2004212177 A | 7/2004 |
| JP | 2004312375 A | 11/2004 |
| WO | WO-2009142943 | 11/2009 |
| WO | WO-2011001206 A1 | 1/2011 |

OTHER PUBLICATIONS

International Search Report and Written Opinion—PCT/US2012/028743—ISA/EPO—Jul. 18, 2012.

*Primary Examiner* — Ajit Patel
(74) *Attorney, Agent, or Firm* — Arnold J. Gum

(57) ABSTRACT

Examples disclosed herein may relate to transmitting almanac information associated with a subset of wireless transmitters to a mobile station. The subset of wireless transmitters may be determined, at least in part, by determining expected contributions of one or more wireless transmitters to a future navigation operation for the mobile station.

28 Claims, 9 Drawing Sheets

(56) References Cited

U.S. PATENT DOCUMENTS

| | | |
|---|---|---|
| 2009/0251364 A1 | 10/2009 | Lorenz |
| 2009/0280775 A1 | 11/2009 | Moeglein et al. |
| 2010/0087205 A1 | 4/2010 | Kong |
| 2010/0234043 A1* | 9/2010 | Wigren et al. ............ 455/456.1 |
| 2011/0057836 A1 | 3/2011 | Ische et al. |
| 2013/0035111 A1 | 2/2013 | Moeglein et al. |
| 2014/0073357 A1* | 3/2014 | Johnson ................... 455/456.3 |

* cited by examiner

PROVIDING WIRELESS TRANSMITTER ALMANAC INFORMATION TO A MOBILE STATION BASED ON EXPECTED CONTRIBUTION TO FUTURE NAVIGATION OPERATION

CROSS-REFERENCE TO RELATED APPLICATIONS

This application is a continuation of U.S. application Ser. No. 13/046,542, now U.S. Pat. No. 8,634,850, filed Mar. 11, 2011, entitled "Providing wireless transmitter almanac information to mobile station based on expected contribution to future navigation operation", which is incorporated herein by reference and assigned to the assignee hereof.

BACKGROUND

I. Field of the Invention

The subject matter disclosed herein relates to determining wireless transmitter almanac information to transmit to a mobile station, and more particularly to basing such determinations on expected contributions of one or more wireless transmitters to a future navigation operation for the mobile station.

II. Background

The position of a mobile station, such as a cellular telephone, may be estimated based on information gathered from various systems. One such system may comprise a Global Navigation Satellite System (GNSS), which is one example of a satellite positioning system (SPS). SPS systems such as GNSS may comprise a number of space vehicles (SV) orbiting the earth. Another example of a system that may provide a basis for estimating the position of a mobile station is a cellular communication system comprising a number of terrestrial wireless transmitters/receivers, often referred to as "base stations," to support communications for a number of mobile stations. A further example of a system that may provide a basis for estimating the position of a mobile station is a wireless network compatible with one or more of the Institute of Electrical and Electronics Engineers (IEEE) 802.11 wireless local access network (WLAN) standards, which may also be referred to as a Wi-Fi network. Such a network may include wireless transmitters/receivers often referred to as "access points," for example.

A position estimate, which may also be referred to as a position "fix", for a mobile station may be obtained based at least in part on distances or ranges measured from the mobile station to one or more wireless transmitters, and also based at least in part on knowledge of the locations of the wireless transmitters. Such transmitters may comprise SVs in the case of an SPS, terrestrial base stations in the case of a cellular communications system, or Wi-Fi/802.11x access or points or other beacon transmitters, for example.

BRIEF SUMMARY

In an aspect, a likelihood of having one or more signals acquired by a mobile station may be determined for individual wireless transmitters of a plurality of wireless transmitters. A subset of wireless transmitters may be determined based, at least in part, on the determined likelihoods for the individual wireless transmitters, and in a further aspect, one or more signals indicative of almanac information for the subset of wireless transmitters may be transmitted to the mobile stations.

In an aspect, a method for developing almanac information, the method comprising: determining a subset of wireless transmitters from a plurality of wireless transmitters, based, at least in part, on a proximity to a route of a mobile station and an expected contribution for each of the plurality of wireless transmitters; and identifying the almanac information for the subset of wireless transmitters.

In a further aspect, a computing platform for developing almanac information, the computing platform comprising: a transceiver; and a processor, coupled to the transceiver, wherein the processor: determines a subset of wireless transmitters from a plurality of wireless transmitters, based, at least in part, on a proximity to a route of a mobile station and an expected contribution for each of the plurality of wireless transmitters; and identifies the almanac information for the subset of wireless transmitters.

In an additional aspect, an apparatus for developing almanac information, the apparatus comprising: means for determining a subset of wireless transmitters from a plurality of wireless transmitters, based, at least in part, on a proximity to a route of a mobile station and an expected contribution for each of the plurality of wireless transmitters; and means for identifying the almanac information for the subset of wireless transmitters.

Additionally, in an aspect, a non-transitory computer-readable medium including program code stored thereon, comprising: program code to determine a subset of wireless transmitters from a plurality of wireless transmitters, based, at least in part, on a proximity to a route of a mobile station and an expected contribution for each of the plurality of wireless transmitters; and program code to identify almanac information for the subset of wireless transmitters.

In a further aspect, an expected contribution to a future navigation operation of a mobile station may be determined at the mobile station for individual wireless transmitters of a plurality of wireless transmitters, based, at least in part, on a value of the expected contribution and a likelihood of having one or more signals acquired by the mobile station for the individual wireless transmitters of the plurality of wireless transmitters. Information indicative of the expected contribution of the mobile station may be transmitted from the mobile station to an almanac server, and one or more signals indicative of almanac information may be received at the mobile station from the almanac server, the almanac information associated with a subset of wireless transmitters determined from the plurality of wireless transmitters based at least in part on the expected contribution for the individual wireless transmitters.

BRIEF DESCRIPTION OF THE DRAWINGS

Non-limiting and non-exhaustive examples will be described with reference to the following figures, wherein like reference numerals refer to like parts throughout the various figures.

DETAILED DESCRIPTION

Figure 1:
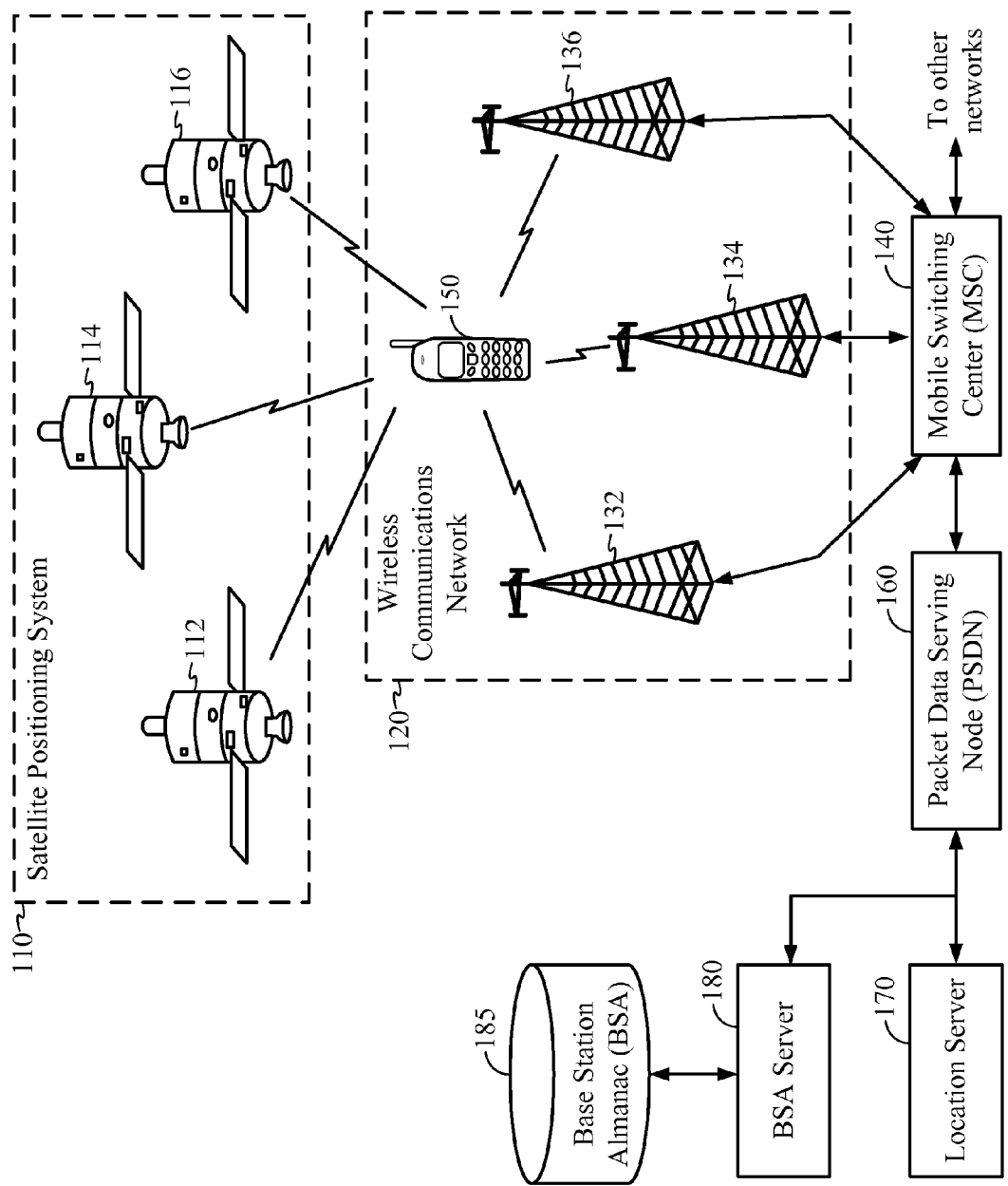
FIG. 1 is a schematic block diagram of an example global navigation satellite system (GNSS) and an example cellular network.

As discussed above, information in an almanac may be used to perform, at least in part, position estimation operations for mobile stations. A position estimate for a mobile station may be obtained based at least in part on distances or ranges measured from the mobile station to one or more transmitters such as space vehicles (SV), terrestrial base stations, or access points, for example, and also based at least in part on the locations of the one or more transmitters. The range to the transmitters may be measured based on one or more characteristics of one or more signals transmitted by the transmitters and received at the mobile station. The location of the transmitters may be ascertained, in at least some cases, based on the identities of the transmitters, and the identities of the transmitters may be ascertained from signals received from the transmitters.

An almanac may be maintained for systems used for position estimation. The almanac may contain various types of information, including, for example, information that may be used in position estimation operations. Such information may include the identities and locations of various wireless transmitters of one or more wireless communications systems, for example.

For some wireless communications systems, an almanac that stores information related to land-based transmitters may be referred to as a "base station almanac" (BSA). The terms "almanac" and "base station almanac" as used herein may be used interchangeably, and are meant to include any organized set of information related to a plurality of transmitters of a wireless communications network. A BSA may be stored in a memory of a computing platform, such as a BSA server, for example, or in a memory of mobile station, for another example. In another aspect, a BSA may be transmitted from a BSA server to one or more mobile stations.

In one aspect, a mobile station may use received almanac information to perform position estimation operations, for example by trilateration or multilateration, using information and measurements from a number of transmitters. A mobile station may also use received almanac information, in another aspect, to narrow a code phase search window for acquiring signals transmitted by an SPS in order to perform position estimation operations using, at least in part, measurements from signals received from one or more space vehicles (SV). For example, to narrow a search window, a mobile station may use BSA information to associate an identification of a cellular communication system sector currently serving the mobile station with an almanac entry. The entry may provide a location of the transmitter for the serving sector, from which an approximate location (within a couple of kilometers, for example) of the mobile station may be obtained.

Mobile stations may have a limited capacity for storing information, due at least in part to size and cost considerations. Also, wireless communication channels may have limited bandwidth. Therefore, it may be advantageous to provide a mobile station with almanac information it is more likely to utilize in position fix operations and to not provide the mobile station with information it is unlikely to utilize. In this manner, the amount of almanac information to be stored at the mobile station may be kept within limits imposed by storage capacity, and the amount of communication channel bandwidth utilized in transmitting almanac information may be reduced.

In an aspect, a subset of a plurality of wireless transmitters may be determined based, at least in part, on expected contributions to a future navigation operation of a mobile station. Expected contributions may be determined, at least in part, based on a value of an expected contribution and a likelihood of having one or more signals acquired by the mobile station for the individual wireless transmitters. Determining the subset of wireless transmitters may comprise determining whether the likelihoods for the individual wireless transmitters exceed a pre-selected threshold. In a further aspect, one or more signals indicative of almanac information for the subset of wireless transmitters may be transmitted to the mobile station. An amount of almanac information delivered to a mobile station may further be limited by a specified maximum amount, in an aspect, although the scope of claimed subject matter is not limited in this respect. In this manner, the mobile station has stored thereon almanac information it is most likely to utilize in performing position fix operations, and the amount of extraneous information delivered to the mobile station and stored thereon may be minimized, at least to an extent. Also, the amount of communication channel bandwidth utilized to deliver the almanac information to the mobile station may be minimized, again at least to an extent.

FIG. 1 is a schematic block diagram of an SPS 110 and a wireless communications network 120 in communication with a mobile station 150. Wireless communications network 120, for this example, may comprise a cellular communications network capable of enabling voice communication for a number of mobile stations including mobile station 150, for example, and may further support position estimation for the mobile stations in addition to providing voice communication. Wireless communications network 120 may comprise any of a number of network types, several examples of which are described below. Wireless communications network 120 for this example comprises base stations 132, 134, and 136 that provide communication for a number of wireless terminals such as, for example, mobile station 150. For simplicity, only a few base stations 132, 134, and 136 are depicted and one mobile station 150 is depicted in FIG. 1. Of course, other examples may include additional numbers of base stations, and the configuration of base stations depicted in FIG. 1 is merely an example configuration. Also, wireless communications network 120 is merely an example wireless communications system, and the scope of claimed subject matter is not limited in this respect.

As used herein, the term "wireless transmitter" is meant to include any wireless communication station or device used to facilitate communication in a wireless communications system, such as, for example, a cellular network, although the scope of claimed subject matter is not limited in this respect. An example type of wireless transmitter utilized in a cellular network may be referred to as a base station. In another aspect, a wireless transmitter may comprise a femtocell, utilized to extend cellular telephone service into a business or home. In such an implementation, one or more mobile stations may communicate with a femtocell via a code division multiple access (CDMA) cellular communication protocol, for example, and the femtocell may provide the mobile station access to a larger cellular telecommunication network by way of another broadband network such as the Internet. In another aspect, wireless transmitters may be included in any of a range of electronic device types. In an aspect, a wireless transmitter may comprise a wireless local area network (WLAN) access point, for example. Such a WLAN may comprise a network that is compatible with one or more of the IEEE 802.11x standards, in an aspect, although the scope of claimed subject matter is not limited in this respect. Additionally, the use of the term "transmitter" in describing a device does not limit that device's function to transmitting only. For example, base stations and access points are typically capable of both transmitting and receiving wireless signals.

As used herein, the term "mobile station" (MS) refers to a device that may from time to time have a position that changes. Such changes in position may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, or other portable communication devices. A mobile station may also comprise a processor or computing platform adapted to perform functions controlled by machine-readable instructions.

In an aspect, SPS 110 may comprise a number of SVs, for example SVs 112, 114, and 116. For an example, SPS 110 may comprise one or more satellite positioning systems, such as GPS, GLONASS and Galileo, although the scope of claimed subject matter is not limited in this respect. In one or more aspects, mobile station 150 may receive signals from SVs 112, 114, and 116, and may communicate with one or more of base stations 132, 134, and 136. For example, mobile station 150 may obtain one or more measurements from one or more signals received from one or more of the SVs or base stations. However, in some circumstances timing signals from an SPS may not be available. In such a circumstance, mobile station 150 may gather propagation delay information through communication with one or more of base stations 132, 134, or 136. Mobile station 150 may calculate a position for the mobile station based, at least in part, on timing calibration parameters received through communication with one or more of base stations 132, 134, or 136, and further based, at least in part, on known locations of the base stations. Mobile station 150 may also make use of an estimated propagation delay for signals received from a base station source, a satellite source, or both, to measure ranges to such sources.

In another aspect, position determination calculations may be performed by a network entity such as, for example, location server 170 depicted in FIG. 1, rather than at mobile station 150. Such a calculation may be based, at least in part, on information gathered by mobile station 150 from one or more of base stations 132, 134, or 136. In a further aspect, location server 170 may transmit the calculated position to mobile station 150.

A mobile switching center (MSC) 140 for this example may be coupled to base stations 132, 134, and 136, and may further couple to other systems and networks, such as a public switched telephone network (PSTN), a packet data serving node (PDSN) 160, and so on. MSC 140 for this example provides coordination and control for the base stations coupled to it and further controls the routing of data to/from the mobile stations served by these base stations. For the example depicted in FIG. 1, PDSN 160 may couple MSC 140 to location server 170 and to a BSA server 180. Location server 170 may collect and format location data, provide assistance to mobile stations for position estimation, or perform computations to obtain position estimates for the mobile stations. BSA server 180 manages a BSA 185, which for this example stores a hierarchal base station almanac for wireless communications network 120. An example of a hierarchal base station almanac is presented below in connection with FIG. 5.

In one aspect, BSA server 180 may provide almanac information to mobile station 150. Information to be provided to mobile station 150 may comprise a subset of BSA 185 selected based, at least in part, upon expected contributions to future navigation operations for mobile station 150. In an aspect, expected contributions may be determined, at least in part, based on likelihoods of having one or more signals acquired by a mobile station for individual wireless transmitters or based on a value of the expected contribution. The term "acquire" as used herein as it relates to wireless signals received at a mobile station refers to a mobile station obtaining sufficient information from a wireless signal to enable processing of the received wireless signal to obtain at least some data transmitted therein. Example types of information that may be obtained by a mobile station in acquiring a wireless signal may include, but are not limited to, carrier frequency, radio-frequency (RF) phase, code, code-phase, timing, or Doppler shift, to list but a few examples. Further, it should be noted that the scope of claimed subject matter is not limited to any particular technique for acquiring a wireless signal.

In determining expected contributions to future mobile station navigation operations, any of a range of types of information may be considered. For example, in an aspect, an expected contribution to a future mobile station may be determined based, at least in part, on one or more of a ranging capability, an expected measurement accuracy, an expected observation accuracy, a coverage area size, or information related to an importance in past navigation operations for the individual wireless transmitters. However, these are merely example types of information that may be used in determining an expected contribution, and the scope of claimed subject matter is not limited in this respect. In an additional aspect, any of a range of types of information may be considered in determining likelihoods of having one or more signals acquired by a mobile station for individual wireless transmitters. For example, in an aspect, such likelihoods may be based, at least in part, on an individual transmitter's proximity to a current location of a mobile station. In another aspect, such likelihoods may be based, at least in part, on how often a mobile station acquired signals from an individual wireless transmitter in the past. In a further aspect, such likelihoods may be based, at least in part, on an individual transmitter's proximity to a historical route of a mobile station. Other examples of information upon which such likelihoods may be based may include radio access types supported by a mobile station, carrier frequencies for individual radio access types supported by a mobile station, radio access types currently enabled on a mobile station, and how often an individual wireless transmitter has signals acquired by a plurality of other mobile stations reporting their observations to a network server such as location server 170. Of course, these are merely examples of types of information that may be utilized in determining likelihoods of having one or more signals acquired by a mobile station for individual wireless transmitters of a plurality of wireless transmitters, and the scope of claimed subject matter is not limited in this respect.

In another aspect, information to be provided to mobile station 150 may comprise a subset of BSA 185 selected based, at least in part, upon one or more additional parameters specified by the mobile station. Such parameters may include, for example, one or more networks or sub-networks specified by mobile station 150, the amount of that the data mobile station 150 tells the network it can store, the specific content of the data, or the granularity of the data, to name but a few examples of parameters that may be specified by the mobile station.

Figure 2:
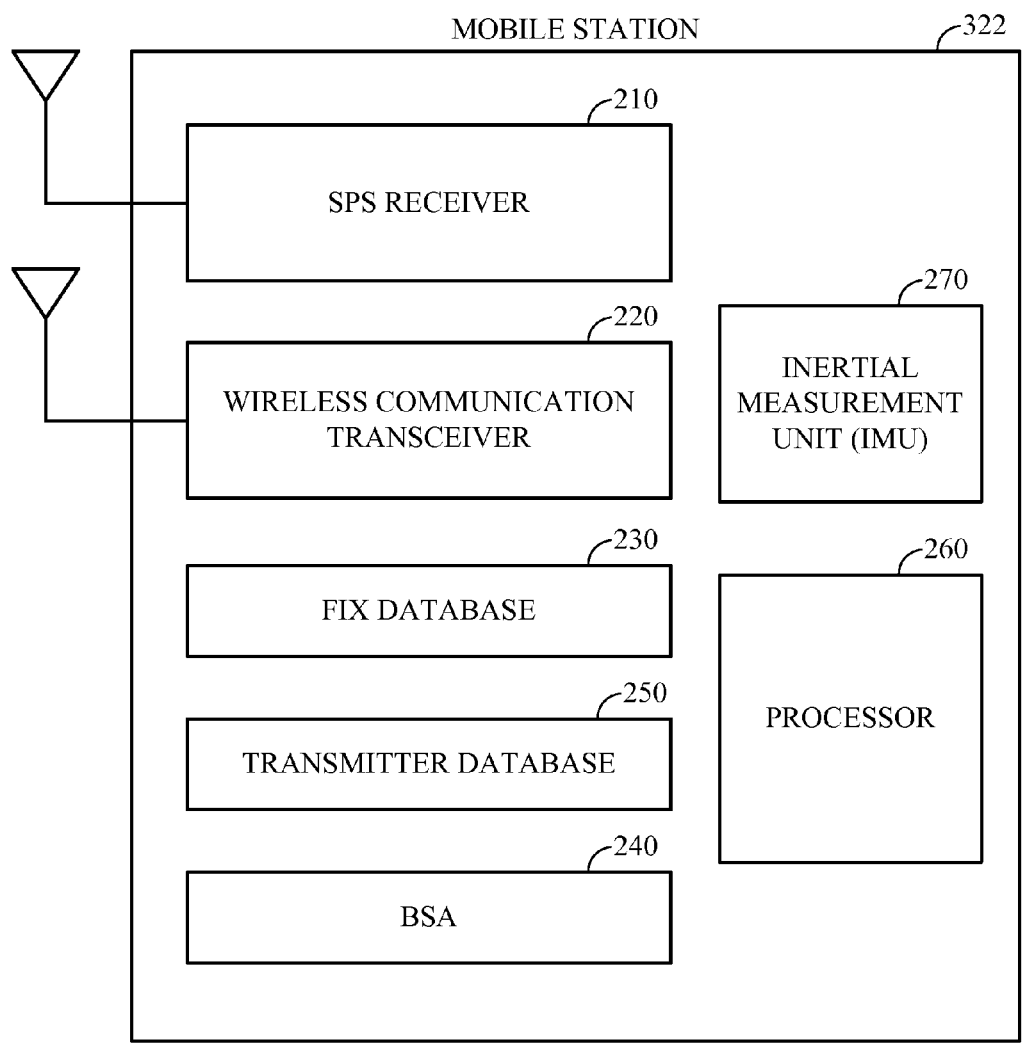
FIG. 2 is a schematic block diagram illustrating an example mobile station.

FIG. 2 is a schematic block diagram of an example implementation of mobile station 322. In an aspect, mobile station 322 comprises an SPS receiver 210 and a wireless communication transceiver 220. Thus, mobile station 322 may communicate both with one or more SPS such as SPS 110 and one or more terrestrial wireless networks, such as wireless communications network 120, which may comprise a cellular network in an aspect, or may comprise a WLAN, in another aspect. In another aspect, mobile station 322 may further comprise a memory device that is partitioned, in one example, to store position fix information in a fix database 230 and to store base station almanac information in a base station almanac (BSA) 240.

Fix information stored in fix database 230 may comprise information gathered in the course of position fix operations. Such position fix information may be stored in transmitter database 250 of mobile station 322 in what may be referred to as a "fix database" in which the fix information is organized or indexed according to particular instances of position fixes. Fix information may also be stored in a transmitter database 250 in which fix information may be organized or indexed according to particular wireless transmitters observed or identified during position fix operations. In a further aspect, mobile station 322 may comprise one or more sensors that for this example are incorporated into Inertial Measurement Unit (IMU) 270 that may be utilized in dead-reckoning navigation operations, for example. Mobile station 322 further comprises processor 260, for this example. Of course, this is merely one example of a configuration of a mobile station, and the scope of claimed subject matter is not limited in this respect.

In an aspect, location information for a plurality of wireless transmitters may be stored in a network entity such as BSA server 180 in wireless communications network 120, or may be stored in any of a wide range of other resources in the wireless network. Further, for an example, location information for wireless transmitters may comprise longitude and latitude, and may for another example also comprise altitude information. However, these are merely examples of location information for wireless transmitters, and the scope of claimed subject matter is not limited in this respect. In another aspect, some wireless transmitters may broadcast their locations, and such location information may be stored in one or more databases in the mobile station, such as in transmitter database 250 of mobile station 322. Such wireless transmitter location information may be shared with other network entities, such as an assistance server or location server such as location server 170 of FIG. 1, for example.

Further, in an additional aspect, BSA 240 may have stored therein a subset of a larger BSA database, such as BSA 185 of FIG. 1, for example. In an aspect, a network entity such as location server 170 or BSA server 180 may determine which of a plurality of wireless transmitters associated with information stored in BSA 185 are likely to have one or more signals acquired by mobile station 322 and may further determine expected contributions to a future mobile station 322 navigation operation for individual wireless transmitters of the plurality of wireless transmitters. As mentioned previously, an expected contribution to a future mobile station may be determined based, at least in part, on one or more of a ranging capability, an expected measurement accuracy, an expected observation accuracy, a coverage area size, or information related to an importance in past navigation operations for the individual wireless transmitters. Further, likelihoods of having one or more signals acquired by mobile station 322 for individual wireless transmitters may be based, at least in part, on an individual transmitter's proximity to a current location of mobile station 322. In another aspect, the likelihoods may be based, at least in part, on a number of occurrences over a period of time in which mobile station 322 has acquired signals from an individual wireless transmitter in the past. In a further aspect, the likelihoods may be based, at least in part, on an individual transmitter's proximity to a historical route of mobile station 322. Other examples of information upon which the likelihoods may be based may include radio access types supported by mobile station 322, rates of use for the individual radio access types supported by mobile station 322, radio access types currently enabled on mobile station 322, and how often an individual wireless transmitter has signals acquired by a plurality of other mobile stations reporting their observations to a network server such as location server 170. Of course, these are merely examples of information that may be utilized in determining likelihoods of having one or more signals acquired by a mobile station for individual wireless transmitters of a plurality of wireless transmitters, and the scope of claimed subject matter is not limited in this respect.

In an aspect, in order for a network entity such as location server 170 or BSA server 180 to determine expected contributions and likelihoods of having one or more signals of a particular wireless transmitter acquired by mobile station 322, the network entity may receive information from mobile station 322. As mentioned above, mobile station 322 may collect information related to position fix operations in fix database 230, including information identifying and locating transmitters observed during the position fix operations. Information related to specific transmitters may be stored, for one example implementation, in transmitter database 250. Information stored in fix database 230 or transmitter database 250 may be provided to the network entity, such as to location server 170 or to BSA server 180, in an example implementation. Information provided to wireless communications network 120 may provide wireless communications network 120 with sufficient information to determine likelihoods of having one or more signals of at least some wireless transmitters acquired by mobile station 322. Of course, just as information may be determined regarding transmitters from which a mobile station has acquired signals in the past, information may also be determined regarding transmitters from which a mobile station has not acquired signals in the past. Transmitters from which a mobile station has not acquired signals in the past may be determined to have a relatively small likelihood of having one or more signals acquired by mobile station 322, in an aspect.

Figure 3:
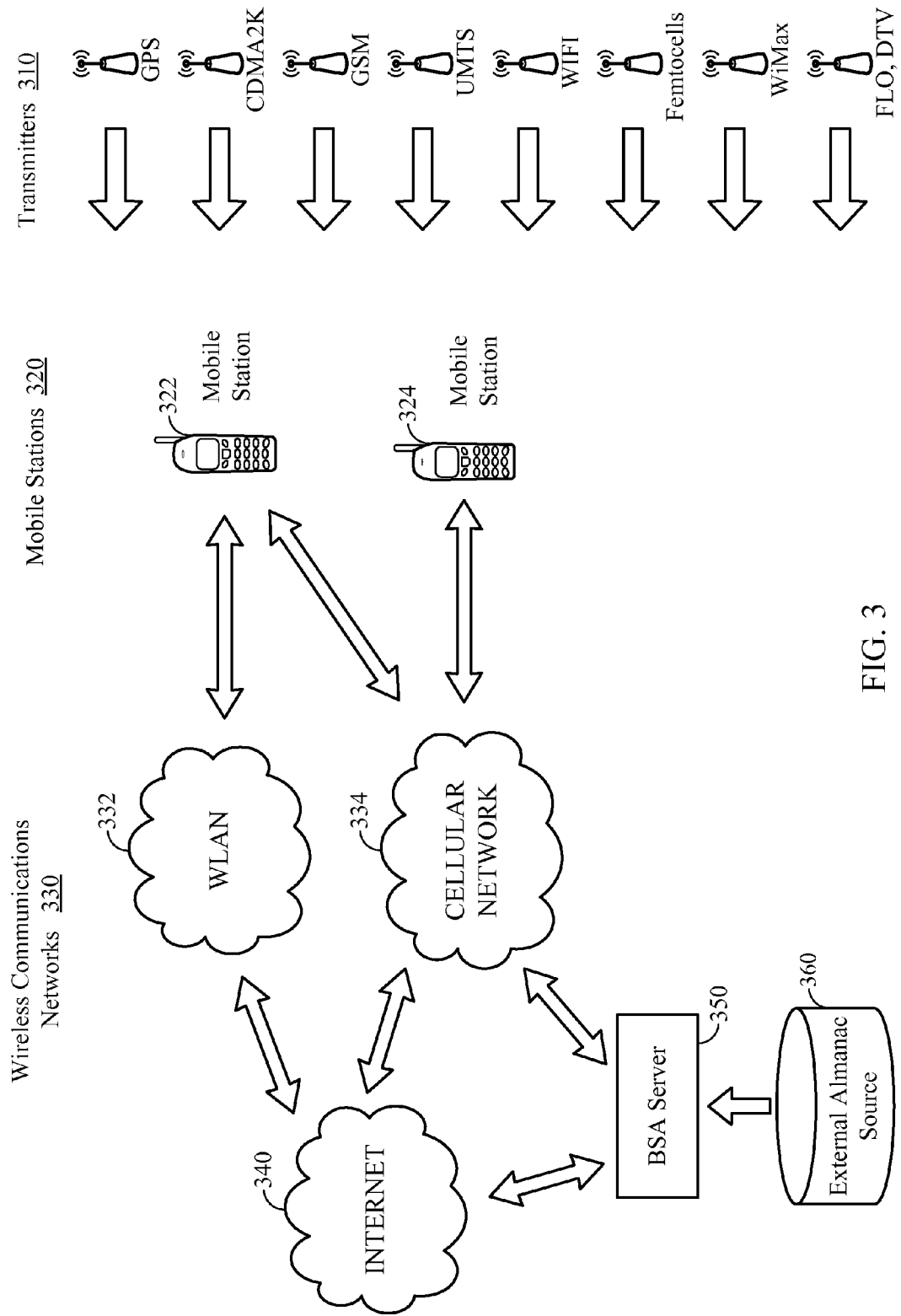
FIG. 3 is an illustration depicting an example almanac server in communication with a number of mobile stations via one or more wireless communications networks.

FIG. 3 is an illustration depicting an example base station almanac (BSA) server 350 in communication with a number of mobile stations 320 via one or more wireless communications networks 330, such as, for example, WLAN 332 and cellular network 334, and via Internet 340. For this example, mobile station 322 may represent a multimode device that may support communication with both packet-switched wireless local area network (WLAN) 332 and cellular network 334. Of course, these are merely examples of the types of wireless communications networks with which a multimode device may communicate, and the scope of claimed subject matter is not limited in this respect. Also for this example, mobile station 324 may represent a single mode device that may support communication with cellular network 334.

Again, the cellular network is merely one example of a wireless communications network with which a mobile station may establish communication.

FIG. 3 further depicts a number of transmitter types 310 that mobile stations 320 may monitor. Mobile stations 320 may or may not be subscribed to any given network associated with the various respective transmitter types to be able to monitor signals transmitted from the various transmitter types. Therefore, BSA information provided to the mobile stations may or may not include information associated with networks to which the mobile stations are not subscribed. Mobile stations may specify particular networks or particular transmitter types if making requests for BSA information. For the example of FIG. 3, one or more of mobile stations 320 may request BSA information comprising at least a subset of a BSA from BSA server 350.

In another aspect, BSA server 350 may obtain a BSA from an external almanac source 360. For example, a cellular network provider may contract with a third party to develop or provide BSA information to BSA server 350. At least a subset of this information may eventually be transmitted to one or more of mobile stations 320. In a further aspect, BSA server 350 may receive BSA information from one or more of mobile stations 320 as one or more of mobile stations 320 develop such information at least in part through monitoring signals transmitted from one or more of example transmitters 310. Additionally, in another aspect, one or more of mobile stations 320 may select whether externally-provided BSA information should be delivered to the mobile station in response to the mobile station making such request or whether BSA information originally developed at least in part by the mobile stations should be delivered. In a further aspect, one or more of mobile stations 320 may select a combination of information from external and local sources.

Although the example of FIG. 3 depicts two mobile stations, in practice a wide variety of mobile station types exhibiting a wide range of different functionalities or storage capabilities may be utilized to communicate with a large variety of potential network types. Further, the mobile stations may exhibit a wide range of different usage patterns. Therefore, it may be advantageous for BSA server 350 to provide individualized subsets of BSA information that the individual mobile stations may require or request, and it may be further advantageous to provide such information formatted in a flexible manner according to a specified file size, coverage area, or transmitter type, to name but a few examples of parameters that may be specified. In one aspect, these parameters may be specified by the mobile stations.

In an additional aspect, transmitters whose information is to be included in the BSA information provided to a requesting mobile station may be determined according to the proximity of individual transmitters to a current estimated location of the requesting mobile station. The idea behind this technique for determining which BSA information to provide to a requesting mobile station is that the requesting mobile station may be more likely to acquire signals in the relatively near future for those wireless transmitters whose coverage areas intersect a specified geometric shape surrounding the estimated location of the mobile station. In an aspect, the shape may comprise a circle with a specified radius extending from the estimated location of the requesting mobile station. For one example, if an individual coverage area for a transmitter intersects the shape, or is wholly enclosed by the shape, or somewhere in between (for example, the estimated center of the coverage area is inside the shape), the given transmitter may have its information included in the BSA information provided to the requesting mobile station. For yet another example, the determination of whether to include information for a given group of transmitters in the BSA information to be provided to a requesting mobile station may be made conditionally, based at least in part on data storage available in the requesting mobile station. For example, information for either individual transmitters or for groups of transmitters may be included, depending upon space availability, where information is added until a BSA information size threshold is reached. The BSA information size may be based, for example, upon a maximum size or upon a desired size of available data storage in the requesting mobile device.

Figure 4:
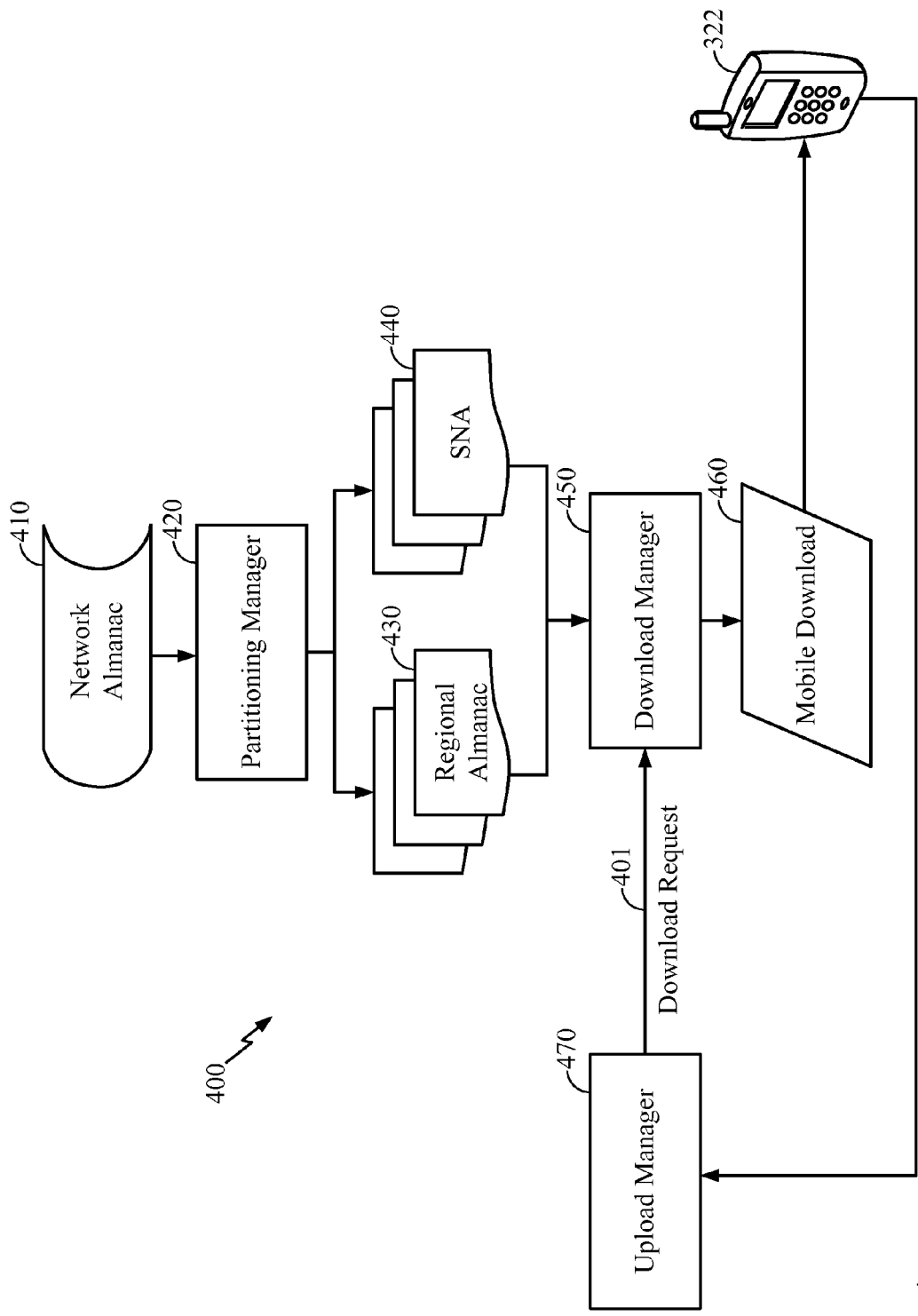
FIG. 4 is an illustration of an example process for delivering almanac information to a mobile station.

FIG. 4 is an illustration of an example process 400 for delivering almanac information to a mobile station. More particularly, FIG. 4 illustrates an example process for delivering a subset of a network almanac 410 to mobile station 322. In an aspect, network almanac 410 may comprise information related to a plurality of wireless transmitters. Network almanac 410 may comprise information, in an example implementation, for a plurality of cellular base stations and also for a plurality of WLAN access points. However, the scope of claimed subject matter is not limited to any particular type of transmitter. Network almanac 410 may store any of a wide range of information types for the plurality of base stations and the plurality of access points, including, for example, location information for at least some of the transmitters. Other types of information that may be stored in network almanac 410 or provided to mobile station 322 are described in more detail below in connection with FIG. 5.

For the example process 400, a partitioning manager 420 may partition network almanac 410 into a number of regional almanac partitions 430 and a number of sparse network almanac (SNA) 440 partitions. A "sparse network almanac" may relate to an almanac comprising groupings of base stations or access points. The groupings may generally be associated with hierarchal identity elements for individual networks represented in the almanac and their underlying regions. Regional almanac partitions 430 may comprise more detailed information partitioned, as the name implies, according a geographic region.

Download manager 450, in an aspect, may determine which information to provide to mobile station 322 by way of a mobile download 460. In an aspect, download manager 450 may select information to provide to mobile station 322 based, at least in part, on expected contributions from individual wireless transmitters associated with information stored in network almanac 410 to future navigation operations for mobile station 322. Expected contributions may be determined, for example, based at least in part on one or more of a ranging capability, an expected measurement accuracy, an expected observation accuracy, a coverage area size, or information related to an importance in past navigation operations for the individual wireless transmitters. Also, information may be selected based, at least in part, on which of a plurality of wireless transmitters associated with information stored in network almanac 410 are likely to have one or more signals acquired by mobile station 322. The likelihoods may be based, at least in part, on an individual transmitter's proximity to a current location of mobile station 322, or, in another aspect, the likelihoods may be based, at least in part, on the a number of occurrences over a period of time in which mobile station 322 has acquired signals from an individual wireless transmitter in the past. For additional examples, the likelihoods may be based, at least in part, on an individual transmitter's proximity to a historical route of mobile station 322, or, in another aspect, the likelihoods may be based, at least in part, on radio access types supported by mobile station 322.

Likelihoods may also be based, at least in part, on rates of use for the individual radio access types supported by mobile station 322, on radio access types currently enabled on mobile station 322, or may also be based, at least in part, on how often an individual wireless transmitter has signals acquired by a plurality of other mobile stations reporting their observations to a network entity such as download manager 450. Of course, these are merely examples of information that may be utilized in determining likelihoods of having one or more signals acquired by a mobile station for individual wireless transmitters of a plurality of wireless transmitters, and the scope of claimed subject matter is not limited in this respect.

Mobile station 322 may provide requests for network almanac information through an upload manager 470, in an aspect, and download request 401 may be forwarded to download manager 450. Also, as mentioned previously, mobile station 322 may provide wireless transmitter information stored in fix database 230 or transmitter database 250 to a network entity, which, for the example depicted in FIG. 4, comprises upload manager 470. Upload manager 470 may further collect wireless transmitter information from a number of other mobile stations, and such information may be added to network almanac 410. In another aspect, as additional information is gathered from various mobile stations for at least some of the wireless transmitters represented in network almanac 410, information may be refined and made more accurate as additional points of reference are obtained. For example, a first mobile station may report a location for a particular wireless transmitter. A second mobile station may report a location for that particular wireless transmitter that is somewhat different from that reported by the first mobile station. With just the two points of reference, it may be difficult in this particular example to determine a reasonably accurate location for the particular wireless terminal. However, if additional reports may be obtained from additional mobile stations or from the same first and second mobile stations at later points in time and at different locations, a more accurate estimate of the location of the particular transmitter may be obtained.

Figure 5:
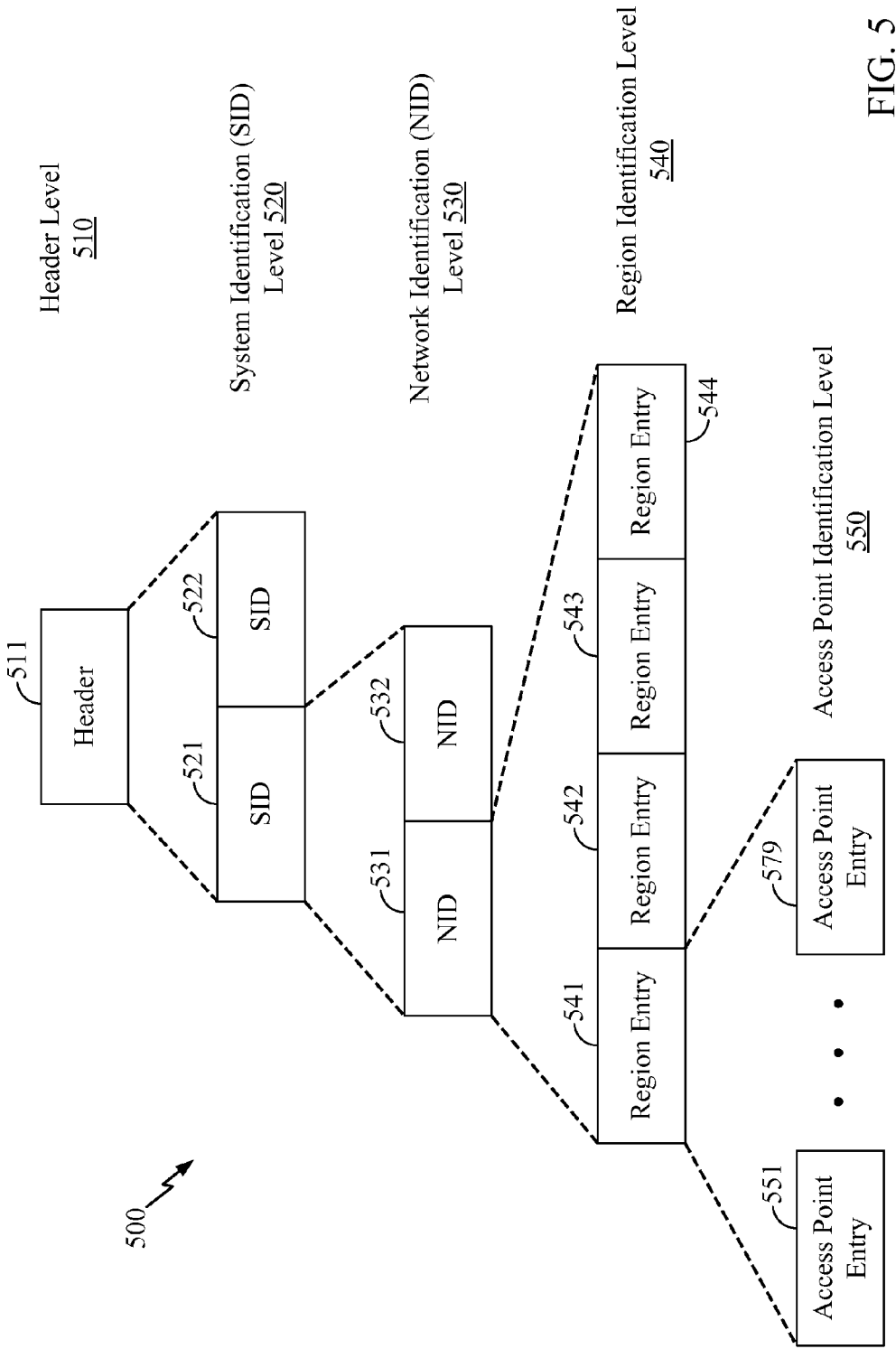
FIG. 5 is a schematic diagram illustrating an example hierarchal organization for a wireless transmitter almanac.

FIG. 5 is a schematic diagram illustrating an example hierarchal wireless transmitter almanac 500. For this example, the hierarchal structure may store information related to a WLAN. However, in the discussion below, elements related to cellular wireless communications are also discussed, as the hierarchal organization that is illustrated may be used for any type of network. As previously noted, mobile stations may have a limited capacity for storing information, due at least in part to size and cost considerations. Typically, much information included in a base station almanac is repetitive due to similar parameters stored for most or all sectors for most or all transmitters across a wireless communications system, such as a cellular system. The information related to the various transmitters may be stored as a flat listing, where specified information for individual transmitters is stored in separate entries for all of the individual sectors for all of the individual transmitters, for example. Therefore, because of the repetitive nature of the transmitter information, and because of a mobile station's limited capacity for storing such information, it may be advantageous to more efficiently store transmitter information in a base station almanac by reducing unnecessary duplication of information.

In one aspect, information for a base station almanac may be stored using a hierarchal organization. The hierarchal organization may comprise a number of levels. In one example, a topmost level may comprise a header, and the lowest level may comprise an access point identification level 550 in the case of a wireless communications system such as WLAN 332, or for a wireless communications system such as cellular network 334, the lowest level may comprise a sector identification (SECTOR_ID) level. Rather than repeating information that may be common across all or nearly all access points or sectors, the common information may be stored in the header. In this manner, a single instance of the common information may be stored in the header, and that information need not be repeated in all of the access point or sector entries. In one aspect, it is understood that the information stored in the header is applicable to all entries of the access point identification or sector identification level unless any exceptions are noted in individual entries of the access point identification or sector identification levels. In general, any information that would otherwise be repeated in a substantial number of entries of a conventional base station almanac may be stored in a single entry in an upper level of a hierarchal base station almanac, thereby greatly reducing the amount of repetition that would otherwise be found in conventional base station almanacs.

Figure 6:
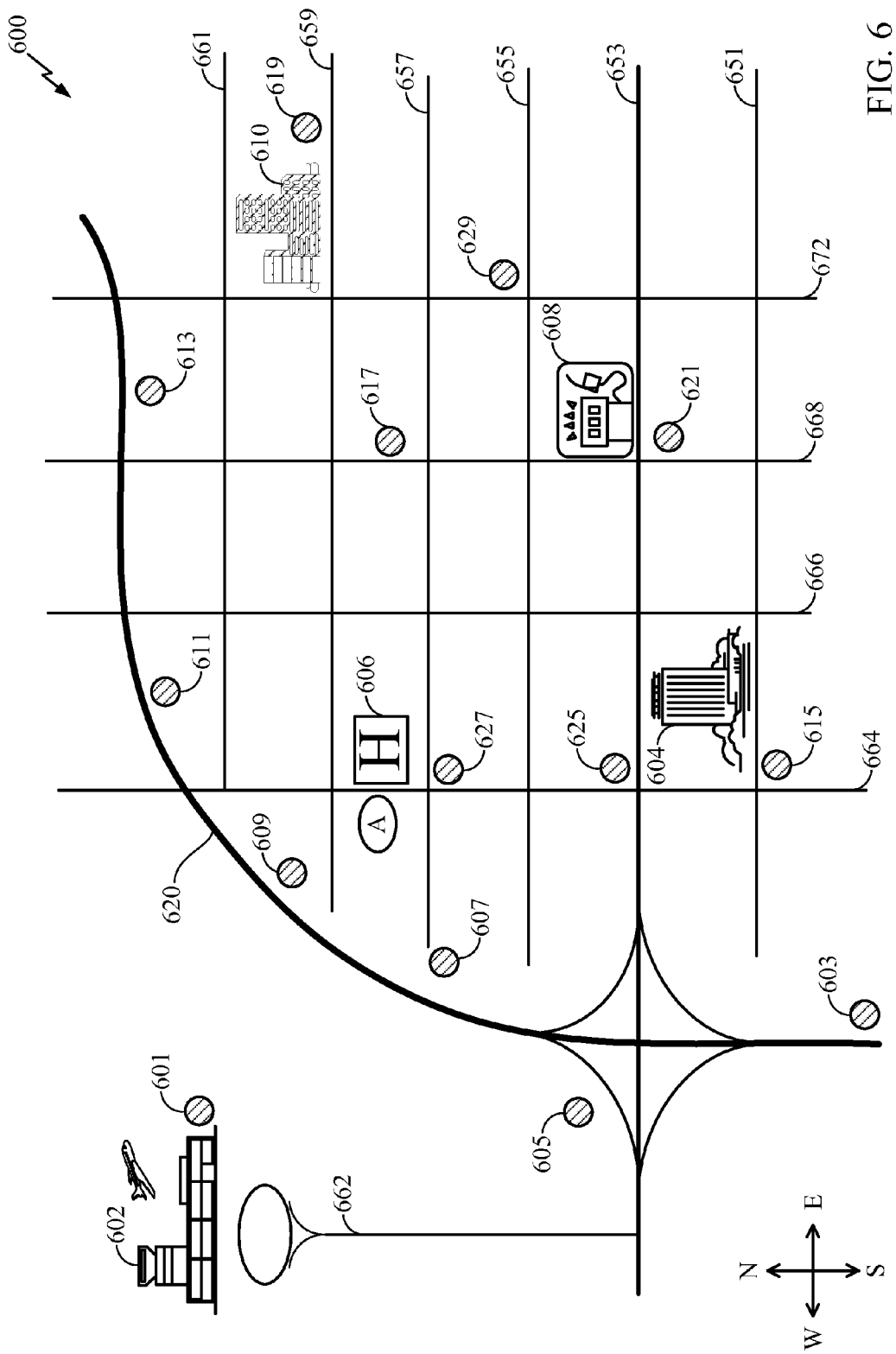
FIG. 6 is an illustration of a map depicting example locations for a number of wireless transmitters.

Hierarchal wireless transmitter almanac 500 in one aspect may represent a BSA stored at a BSA server such as BSA servers 180 or 350. In another aspect, hierarchal wireless transmitter almanac 500 may represent BSA information to be transmitted to a mobile station and stored in the mobile station. One example type of wireless communications network may comprise a code division multiple access (CDMA) network. A CDMA network may comprise ID parameters that may be organized hierarchically. Therefore, it may be advantageous to convey an almanac for a given set of transmitters in a hierarchal fashion. Similarly, ID parameters for WLAN 332 may be organized in a hierarchal fashion. For the example depicted in FIG. 5, hierarchal wireless transmitter almanac 500 may comprise a plurality of hierarchal levels, such as header level 510, a system identification (SID) level 520 that may comprise one or more system identification level entries, a network identification level (NID) 530 that may comprise one or more network identification level entries, a region identification level 540 in the case of a WLAN or a cell identification level in the case of a cellular network, and access point identification level 550 in the case of a WLAN or a sector identification level in the case of a cellular network. For the example of FIG. 5, SID level 520 comprises a pair of entries SID 521 and SID 522, NID level 530 comprises entries NID 531 and NID 532, region identification level 540 comprises region entries 541-544, and access point identification level 550 comprises access point entries 551-579 (skipping even numbers, as seen in FIG. 6). NID entries 531 and 532 may comprise one or more network identifiers that may identify one or more network providers, for one example. Region entries 541-544 may comprise one or more region identification values or one or more region identifiers, and access point entries 551-579 may comprise one or more access point identification values, in an aspect. Of course, the example organization depicted for hierarchal wireless transmitter almanac 500 is merely an example, and the scope of claimed subject matter is not limited in these respects. For example, the scope of claimed subject matter is not limited to the specific numbers or types of levels depicted for hierarchal wireless transmitter almanac 500. Similarly, the scope of claimed subject matter is not limited to the depicted numbers or types of entries within the various levels of hierarchal wireless transmitter almanac 500.

In an additional aspect, some networks do not utilize hierarchical encoding schemes. Wireless access points, such as those that may be part of WLAN 332, for example, may be organized in an ad hoc manner, according to where their owners place them. A wireless access point almanac is likely to be more dense, due to a larger number of transmitters. The wireless transmitters to be included in a BSA subset to be transmitted to a mobile station such as mobile station 322 may be selected based at least in part on their locations within a geometrically shaped area specified by the mobile station, or by the inclusion of their coverage areas in the specified area. The granularity of the information provided may be greater at the center of the area of interest than at locations farther away, in one aspect. This would allow mobile station 322 to receive BSA information from BSA server 350 with more density and accuracy where mobile station 322 is likely to be located in the near term, but also have almanac information for a broader area. For example, mobile station 322 may specify in its request to BSA server 350 the densest almanac nearest its own estimated location, and may also specify coarser almanac information at further distances.

FIG. 6 is an illustration of a map 600 depicting example locations for a number of wireless transceivers, labeled as black dots on map 600. For the example of FIG. 6, map 600 depicts access points 601, 603, 605, 607, 609, 611, 613, 615, 617, 619, 621, 625, 627, and 629 distributed in various locations. Access points 601-629 in an aspect may comprise WLAN access points, although the scope of claimed subject matter is not limited in this respect. Also depicted in map 600 are an airport 602, a freeway 620, a hospital 606, an office building complex 619, an automobile service station 608, and an office building 604. Map 600 further depicts a number of streets running north and south, labeled 664, 666, 668, 672, and street 662 providing access to airport 602. Also, several streets are depicted running east and west, labeled 651, 653, 655, 657, 659, and 661. Of course, map 600 and its various components are merely presented for purposes of facilitating discussion of various aspects of claimed subject matter. Map 600 and its components are not meant to depict a realistic or accurate arrangement or configuration of buildings, streets, or access points, for example.

As previously discussed, a mobile station such as mobile station 322 may be provided a subset of almanac information based, at least in part, on expected contributions from individual access points of a plurality of access points to future navigation operations for mobile station 322. Expected contributions may be based, for example, on a value of the expected contribution and also on a likelihood of having one or more signals acquired by mobile station 322 for the individual access points. Further, in an aspect, likelihoods of having one or more signals acquired by mobile station 322 for the individual access points may be based, at least in part, on an individual access point's proximity to a current location of mobile station 322. For example, assume that mobile station 322 estimates its location to be at position "A" on map 600, located at hospital 606 on street 664 between streets 657 and 659. In an aspect, mobile station 422 may have sufficient data storage capacity to hold almanac information for access points 601-629. However, in a more realistic setting, a region such as that depicted in map 600 would likely include a great deal more access points than those depicted. For example, each of office buildings 604 and 610 may have a number of access points inside the building. Many homes, offices, retail establishments, restaurants, etc., may incorporate access points in order to provide Wi-Fi access to residents, tenants, customers, employees, travelers, and so forth. However, for purposes of explanation, it is assumed for the examples related to FIG. 6 that access points 601-629 represent all of the access points with known or estimated information available for storage in an almanac.

For the examples related to FIG. 6 and map 600, mobile station 322 may have access to hierarchal wireless transmitter almanac 500. For one or more examples, the area depicted in map 600 may correspond to region entry 541 of hierarchal wireless transmitter almanac 500, depicted in FIG. 5. Access points 601-629 are respectively associated with access point entries 551-579 in access point identification level 550 of hierarchal wireless transmitter almanac 500. Note that the access point entries 551-579 of access point identification level 550 are associated with region entry 541. In an aspect, region entry 541 may include information identifying access point entries 551-579 as being associated with region entry 541. Region entry 541 may comprise information that is common to all or most of the access points that relate back to region entry 541. For example, if all of the access points are compatible with the IEEE 801.11g standard, region entry 541 may store that information, and that information would not need to be stored in the individual access point entries 551-579.

Returning to the example where mobile station 322 is located at position "A" at hospital 606, a determination may be made by a network entity such as download manager 450 or BSA server 350 as to which of the plurality of access points 601-629 are likely to have one or more signals acquired by mobile station 322 in the near term. For this example, a determination may be based, at least in part, on proximities of the individual access points to an estimated location of mobile station 322. In an aspect, access points closest in range to position "A" would have a greater likelihood of having signals acquired by mobile station 322 in the near term. In another aspect, a determination may be made as to which of access points 601-629 are closest in range to position "A", and at least in part in response to such a determination, almanac information associated with those access points determined to be closest in range to position "A" may be delivered to mobile station 322. In this manner, as mobile station 322 moves from point "A", almanac information for those access points that mobile station 322 is likely to observe is already stored at mobile station 322. For this example, access points 607, 609, and 627 may be determined to be likely to have signals acquired by mobile station 322. Of course, in an actual implementation, many more access points may be involved. In another aspect, position fixes for mobile station 322 may be repeated periodically, and almanac information stored at mobile station 322 may be updated accordingly.

Another example technique mentioned above may relate to determining the likelihoods of having one or more signals acquired by mobile station 322 for individual access points of a plurality of access points based, at least in part, on a number of occurrences over a period of time in which mobile station 322 has acquired signals from individual access points in the past. For the present example, assume that a user carries mobile station 322 with him/her to work 5 times a week, and further assume that the user's path to get to work includes driving east to west on street 653 past access points 621 and 625. The user returns from work driving west to east along the same street, again passing by access points 621 and 625. Therefore, for this simple example, access points 621 and 625 are observed by mobile station 322 at least 10 times per week. Additionally, assume that the user rarely travels along street 651. Therefore, mobile station 322 would rarely observe access point 615. As a result, for this example, access points 621 and 625 may be determined to have a likelihood of having one or more signals acquired by mobile station 322, and mobile station 322 may be provided almanac information related to those access points. Also, although for this example access point 615 is relatively close in distance to access point 625, because mobile station 322 rarely observes access point 615, almanac information for access point 615 may not be provided to mobile station 322, for example.

For an additional example, a technique for determining likelihoods of having one or more signals acquired by mobile station 322 for individual access points of a plurality of access points may include determining such likelihoods based, at least in part, on an individual access point's proximity to a historical route of mobile station 322. Returning to map 600, assume that the user occasionally caries mobile station 322 with him/her while traveling along freeway 620, moving south-to-north. For this simple example, although it may not happen often, every or almost every time mobile station observes access points 603, 605, and 607, in that order, mobile station 322 continues on to observe access points 609, 611, and 613. Therefore, a network resource such as download manager 450 or BSA server 350 may, upon determining that mobile station 322 is proceeding along a historical route with a likelihood that mobile station will observe access points along that path, provide mobile station 322 with almanac information related to the access points along that historical route.

As another example of a historical route, assume that a majority of the time that mobile station 322 observes access points 605 then 601, indicating traveling to airport 602, mobile station next finds itself at San Francisco International airport (SFO). For this example, if download manager 450 determines that mobile station 322 has observed access points 605 and 601 in succession, download manager may provide almanac information related to SFO to mobile station 322 so that should mobile station 322 indeed end up at SFO, it will already have stored therein the desired almanac information, and navigation may commence immediately upon arrival.

In an additional aspect, a technique for determining likelihoods of having one or more signals acquired by mobile station 322 for individual access points of a plurality of access points may include determining such likelihoods based, at least in part, on an individual access point's proximity to a predicted route of mobile station 322. In an aspect, a predicted route may be based, at least in part, on one or more historical routes of mobile station 322, although claimed subject matter is not limited in scope in this respect. In another aspect, as mentioned previously, likelihoods may be based, at least in part, on radio access types supported by mobile station 322. Likelihoods may also be based, at least in part, on rates of use for the individual radio access types supported by mobile station 322, on radio access types currently enabled on mobile station 322, or may also be based, at least in part, on a number of occurrences over a period of time in which an individual wireless transmitter has signals acquired by a plurality of other mobile stations reporting their observations to a network entity such as download manager 450. Of course, these are merely examples of information that may be utilized in determining likelihoods of having one or more signals acquired by a mobile station for individual wireless transmitters of a plurality of wireless transmitters, and the scope of claimed subject matter is not limited in this respect.

In examples described herein, a mobile station such as mobile station 322 is described as requesting BSA information from BSA server 350. In response to receiving the request from mobile station 322, BSA server 350 configures the appropriate information and delivers the configured information to mobile station 322. However, there may be a number of variations to these examples, in that there may be various techniques to communicate BSA information to mobile station 322. In some cases, the technique used may depend at least in part on a particular type of air interface. In some air interfaces, a transmitting entity may also be able to store and forward its own BSA information or that of its neighbors. For example, referring to FIG. 1, base station 132 may store BSA information, and may forward at least a portion of that BSA information to mobile station 150 upon receiving a request from mobile station 150. Base station 132 may compress or encrypt the information in accordance with the examples mentioned above. In another aspect, base station 132 may authenticate mobile station 150 before granting the mobile station's request for BSA information.

Additionally, in one aspect, base station 132 may periodically broadcast BSA information to mobile stations that are within range and that have the capability and authority to communicate with base station 132. Such a transmission may be made with or without prompting from a mobile station or from another network entity. In another aspect, mobile station 150 may be provided a uniform resource locator (URL) that points to a network location from where mobile station 150 may obtain BSA information. For the example of FIG. 1, the network entity may comprise BSA server 180. However, as depicted in FIG. 3, a mobile station may also obtain database information from a third party external almanac source 360, for another example. In an aspect, a mobile station such as mobile station 324 may subscribe to a service from the third party external almanac source 360 that provides on-demand BSA updates. Alternatively, in another aspect, the third party external almanac source 360 may provide the updates on a periodic basis, or whenever a need arises due to system reconfiguration, for example.

As noted previously, BSA server 350 may receive BSA information from a third party in one aspect. In another aspect, BSA server 350 or any other network entity that stores BSA information, such as one or more base stations or access points, may receive BSA information gathered from one or more mobile stations. The information gathered from the mobile stations may comprise information gathered during position estimation operations, for example. In another aspect, some mobile stations may store a database of transmitters from which they have received signals. The database may comprise, in one aspect, certain attributes about those transmitters, such as, for example, location information, carrier frequency, etc. This information may have been provided to the mobile stations by the wireless network, or the information may have been derived by the mobile stations themselves. Regardless of the source, the gathered information may be desirable in the development and maintenance of a BSA that may be used by mobile stations in a given area.

In an additional aspect, a mobile station may be expected to report a specified amount of information to a base station almanac server, for example, in exchange for more complete BSA information. Information gathered and reported by the mobile station may comprise a series of locations along with respective location uncertainties, and may further comprise discovered attributes of transmitters the mobile station observed from those locations. The attributes might include transmitter identification information, for example, as well as signal carrier frequency, relative or absolute signal strength, color coding, slot timing, or any other pertinent information that may help the BSA server to map the coverage area of the individual transmitters. The attributes may further include code phase for individual transmitters, or timing relationships between some standard timing source (such as SPS time) and the framing structure of one or more received signals.

Figure 7:
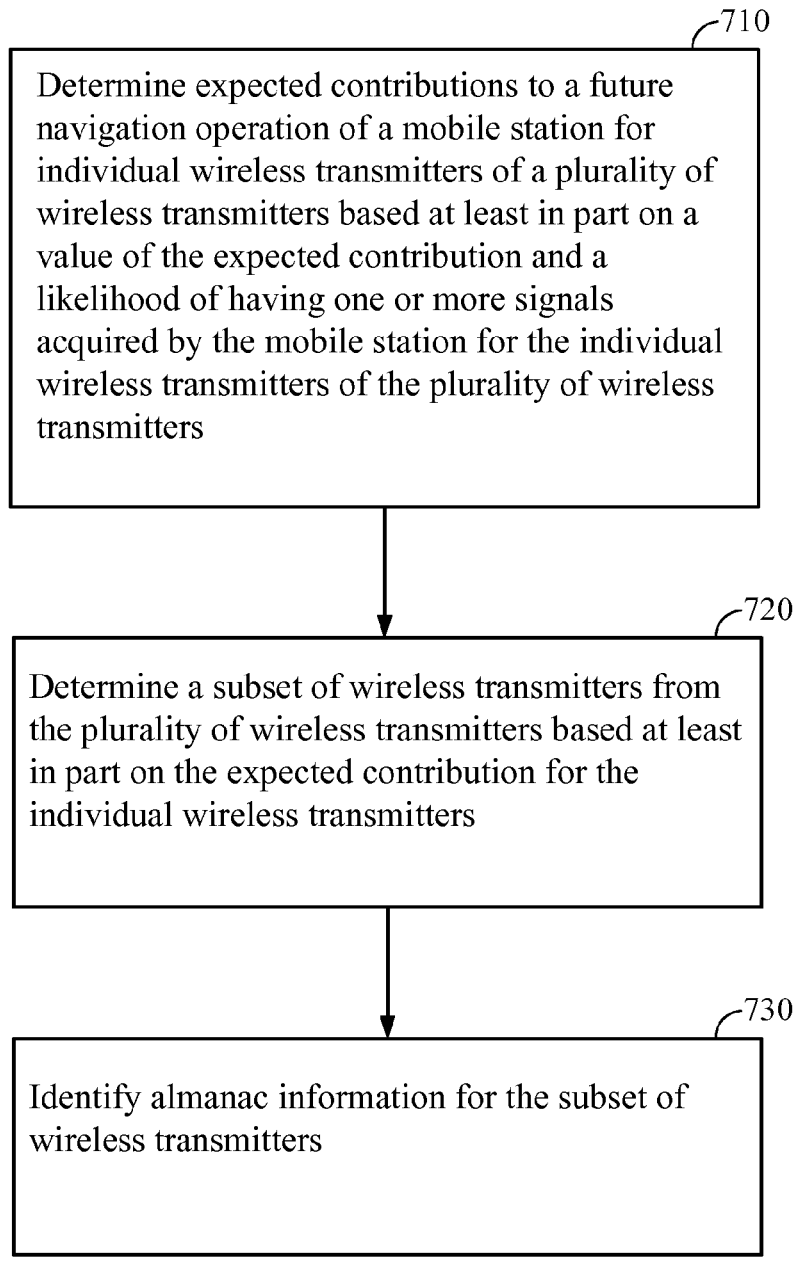
FIG. 7 is a flow diagram of an example process for determining a subset of wireless transmitter almanac information, based at least in part on an expected contribution to a future navigation operation of a mobile station.

FIG. 7 is a flow diagram of an example process for determining a subset of wireless transmitter almanac information to transmit to a mobile station, based at least in part on one or more expected contributions of one or more respective wireless transmitters to a future navigation operation for the mobile station. At block 710, an expected contribution to a future navigation operation for a mobile station may be determined for individual wireless transmitters of a plurality of wireless transmitters based at least in part on a value of the expected contribution and a likelihood of having one or more signals acquired by the mobile station for the individual wireless transmitters of the plurality of wireless transmitters. In an aspect, values for expected contributions may be based, by way of non-limiting example, on ranging capability, expected measurement or observation accuracy, coverage area size, or statistics related to the importance of a particular transmitter in previous navigation operations. Examples of possible techniques for determining likelihoods of having one or more signals acquired by a mobile station for the individual wireless transmitters are discussed above, and may include, for example, determining such likelihoods based, at least in part, on an individual transmitter's proximity to a current location the mobile station, or, in another aspect, such likelihoods may be based, at least in part, on how often the mobile station has acquired signals from an individual wireless transmitter in the past. For additional examples, likelihoods may be based, at least in part, on an individual transmitter's proximity to a historical route of a mobile station, or, in another aspect, such likelihoods may be based, at least in part, on radio access types supported by a mobile station. Likelihoods may also be based, at least in part, on rates of use for the individual radio access types supported by the mobile station, on radio access types currently enabled on the mobile station, or may also be based, at least in part, on a number of occurrences over a period of time in which an individual wireless transmitter has signals acquired by a plurality of other mobile stations reporting their observations to a network entity such as a download manager or BSA server. Likelihoods may be based, at least in part, on an individual transmitter's proximity to a predicted route of a mobile station, or on whether a mobile station is authorized to communicate through the wireless transmitter, for other examples.

At block 720, a subset of wireless transmitters may be determined based at least in part on the determined expected contributions for the individual wireless transmitters. In an aspect, determining the subset of wireless transmitters may comprise determining whether the likelihoods for the individual wireless transmitters exceed a pre-selected threshold. At block 730, almanac information for the determined subset of wireless transmitters may be identified. Examples in accordance with claimed subject matter may include all of, less than, or more than blocks 710-730. Further, the order of blocks 710-730 is merely an example order, and the scope of claimed subject matter is not limited in this respect.

Figure 8:
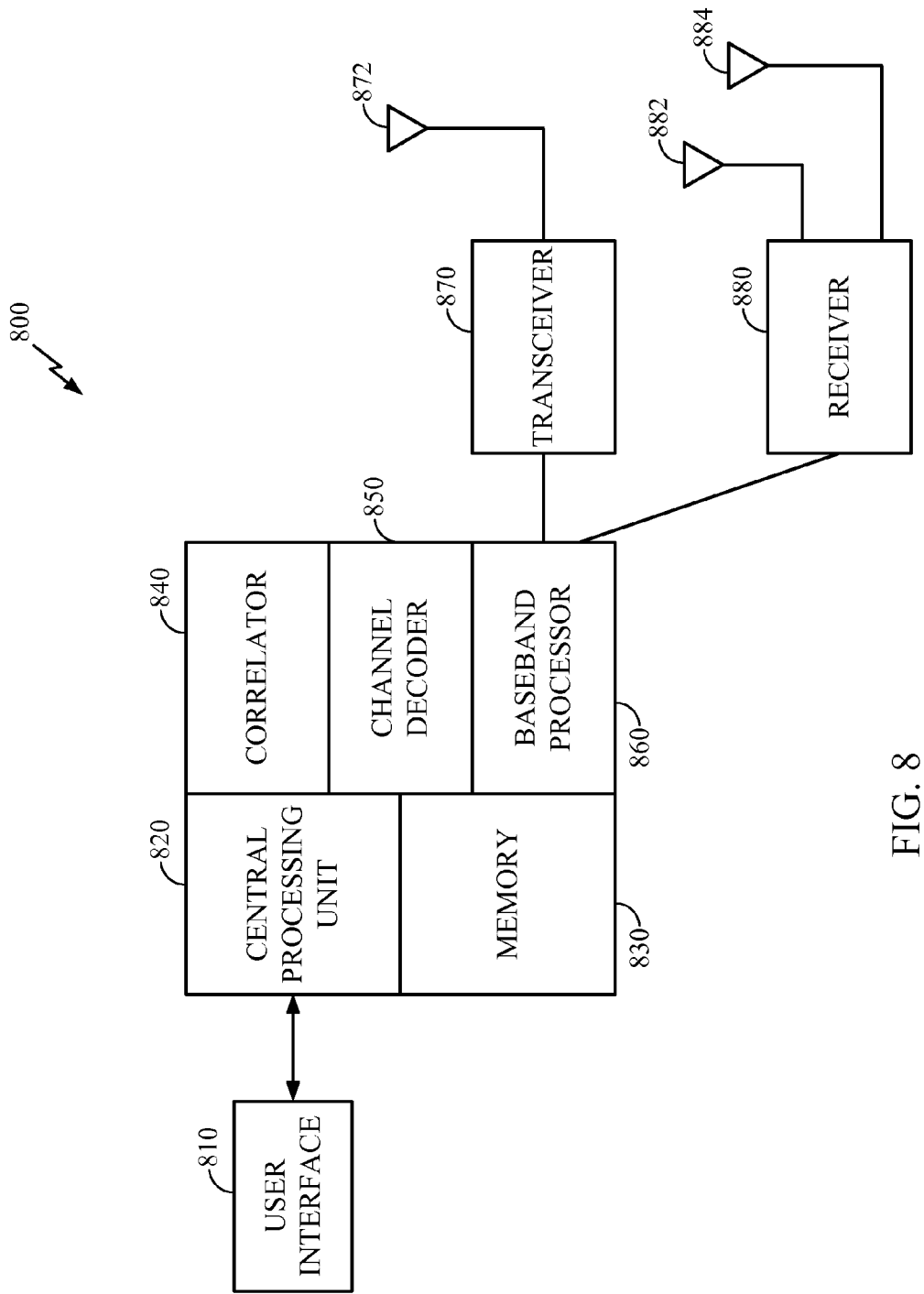
FIG. 8 is a schematic block diagram depicting an example mobile station.

FIG. 8 is a block diagram of an example of mobile station 800 that may be adapted to perform any of the example techniques described herein in connection with FIGS. 1-7. One or more radio transceivers 870 may be adapted to modulate an RF carrier signal with baseband information, such as voice or data, onto an RF carrier, and demodulate a modulated RF carrier to obtain such baseband information. An antenna 872 may be adapted to transmit a modulated RF carrier over a wireless communications link and receive a modulated RF carrier over a wireless communications link.

A baseband processor 860 may be adapted to provide baseband information from a central processing unit (CPU) 820 to transceiver 870 for transmission over a wireless communications link. Here, CPU 820 may obtain such baseband information from an input device within a user interface 810. Baseband processor 860 may also be adapted to provide baseband information from transceiver 870 to CPU 820 for transmission through an output device within user interface 810.

User interface 810 may comprise a plurality of devices for inputting or outputting user information such as voice or data. Such devices may include, by way of non-limiting examples, a keyboard, a display screen, a microphone, and a speaker.

A receiver 880 may be adapted to receive and demodulate transmissions from an SPS, and provide demodulated information to correlator 840. Correlator 840 may be adapted to derive correlation functions from the information provided by receiver 880. Correlator 840 may also be adapted to derive pilot-related correlation functions from information relating to pilot signals provided by transceiver 870. This information may be used by a mobile station to acquire wireless communications services. Channel decoder 850 may be adapted to decode channel symbols received from baseband processor 860 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 850 may comprise a turbo decoder.

A memory 830 may be adapted to store machine-readable instructions which are executable to perform one or more of processes, implementations, or examples thereof which are described or suggested herein. CPU 820 may be adapted to access and execute such machine-readable instructions.

Figure 9:
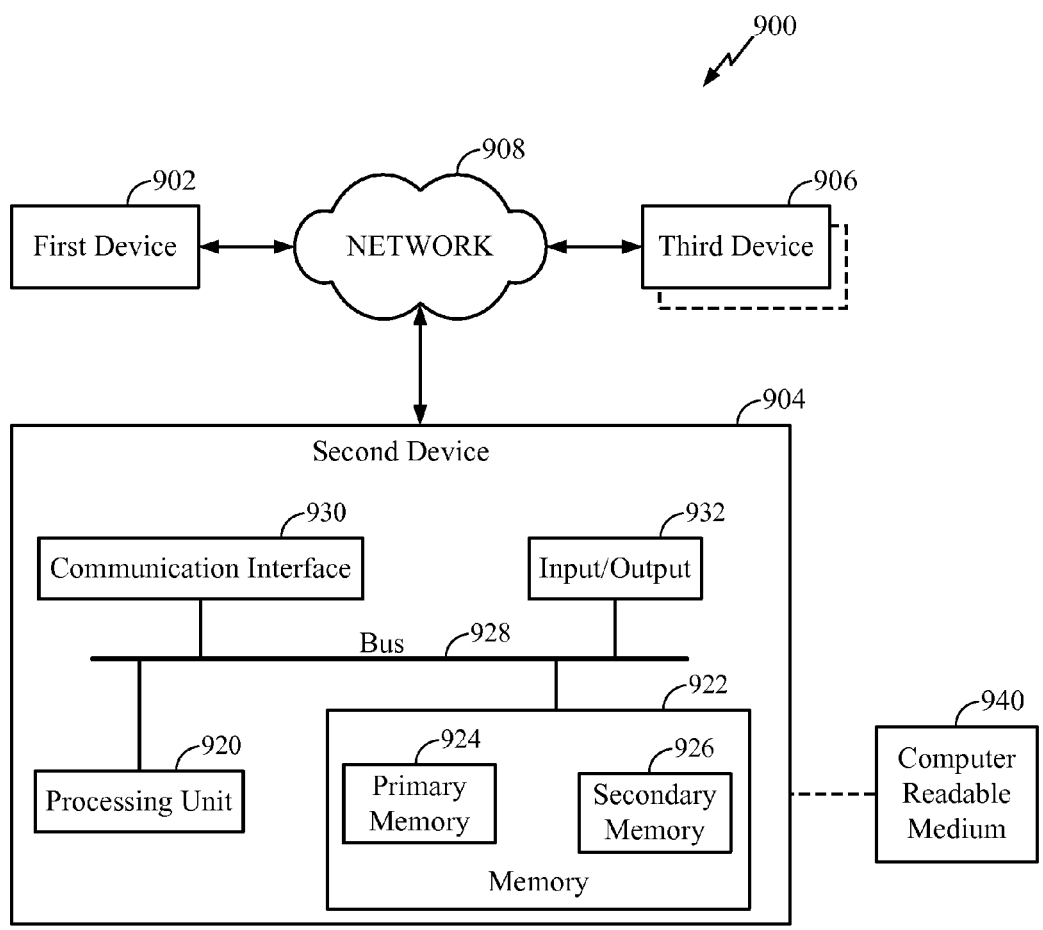
FIG. 9 is a schematic block diagram of an example computing platform.

FIG. 9 is a schematic diagram illustrating an example system 900 that may include one or more devices configurable to implement techniques or processes described above, for example, in connection with example techniques for determining almanac information to provide to a mobile station and for transmitting the almanac information, depicted in FIGS. 1-7. System 900 may include, for example, a first device 902, a second device 904, and a third device 906, which may be operatively coupled together through a wireless communications network 908.

First device 902, second device 904 and third device 906, as shown in FIG. 9, may be representative of any device, appliance or machine that may be configurable to exchange data over wireless communications network 908. By way of example but not limitation, any of first device 902, second device 904, or third device 906 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 902, 904, and 906, respectively, may comprise one or more of a base station almanac server, a base station, or a mobile station in accordance with the examples described herein.

Similarly, wireless communications network 908, as shown in FIG. 5, is representative of one or more communication links, processes, or resources configurable to support the exchange of data between at least two of first device 902, second device 904, and third device 906. By way of example but not limitation, wireless communications network 908 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 906, there may be additional like devices operatively coupled to wireless communications network 908.

It is recognized that all or part of the various devices and networks shown in system 900, and the processes and methods as further described herein, may be implemented using or otherwise including hardware, firmware, software, or any combination thereof.

Thus, by way of example but not limitation, second device 904 may include at least one processing unit 920 that is operatively coupled to a memory 922 through a bus 928.

Processing unit 920 is representative of one or more circuits configurable to perform at least a portion of a data computing procedure or process. By way of example but not limitation, processing unit 920 may include one or more processors, controllers, microprocessors, microcontrollers, application specific integrated circuits, digital signal processors, programmable logic devices, field programmable gate arrays, and the like, or any combination thereof.

Memory 922 is representative of any data storage mechanism. Memory 922 may include, for example, a primary memory 924 or a secondary memory 926. Primary memory 924 may include, for example, a random access memory, read only memory, etc. While illustrated in this example as being separate from processing unit 920, it should be understood that all or part of primary memory 924 may be provided within or otherwise co-located/coupled with processing unit 920.

Secondary memory 926 may include, for example, the same or similar type of memory as primary memory or one or more data storage devices or systems, such as, for example, a disk drive, an optical disc drive, a tape drive, a solid state memory drive, etc. In certain implementations, secondary memory 926 may be operatively receptive of, or otherwise configurable to couple to, a computer-readable medium 940. Computer-readable medium 940 may include, for example, any medium that can carry or make accessible data, code or instructions for one or more of the devices in system 900. Computer readable medium 940 may also be referred to as a storage medium.

Second device 904 may include, for example, a communication interface 930 that provides for or otherwise supports the operative coupling of second device 904 to at least wireless communications network 908. By way of example but not limitation, communication interface 930 may include a network interface device or card, a modem, a router, a switch, a transceiver, and the like.

Second device 904 may include, for example, an input/output device 932. Input/output device 932 is representative of one or more devices or features that may be configurable to accept or otherwise introduce human or machine inputs, or one or more devices or features that may be configurable to deliver or otherwise provide for human or machine outputs. By way of example but not limitation, input/output device 932 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method for developing almanac information, the method comprising:
   determining a subset of wireless transmitters from a plurality of wireless transmitters, based, at least in part, on a proximity to a route of a mobile station and an expected contribution for each of the plurality of wireless transmitters; and
   identifying the almanac information for the subset of wireless transmitters.

2. The method of claim 1, wherein the route comprises a predicted route.

3. The method of claim 1, further comprising:
   transmitting from a communication interface of an almanac server, to the mobile station, one or more signals indicative of the almanac information for the subset of wireless transmitters.

4. The method of claim 3, wherein the one or more signals indicative of the almanac information fit within a specified maximum transmission size.

5. The method of claim 1, further comprising:
   receiving from the mobile station at a network entity one or more signals indicative of information identifying the almanac information for the subset of wireless transmitters; and
   transmitting, to the mobile station, one or more signals indicative of the almanac information for the subset of wireless transmitters.

6. The method of claim 1, wherein the expected contribution is based, at least in part, on one or more of:
   a ranging capability,
   an expected measurement accuracy,
   an expected observation accuracy,
   a coverage area size, and
   information related to an importance in past navigation operations.

7. The method of claim 6, wherein determining the subset of wireless transmitters comprises determining a likelihood of having one or more signals acquired by the mobile station for the subset of wireless transmitters based, at least in part, on whether the likelihood exceeds a threshold.

8. The method of claim 7, wherein determining the likelihood of having the one or more signals acquired by the mobile station for the subset of wireless transmitters exceeds the threshold is based at least in part on one or more of:
   a proximity of the subset of wireless transmitters to the mobile station,
   a predicted route of the mobile station, or
   one or more historical routes traveled by the mobile station.

9. The method of claim 7, wherein determining the likelihood of having the one or more signals acquired by the mobile station for the subset of wireless transmitters exceeds the threshold is based at least in part on a number of occurrences over a period of time of past acquisitions of signals from the subset of wireless transmitters by the mobile station.

10. The method of claim 7, wherein determining the likelihood of having the one or more signals acquired by the mobile station for the subset of wireless transmitters exceeds the threshold is based at least in part on one or more of:
    radio access types supported by the mobile station,
    rates of use of the radio access types supported by the mobile station, and
    a radio access type currently enabled by the mobile station.

11. The method of claim 7, wherein determining the likelihood of having the one or more signals acquired by the mobile station for the subset of wireless transmitters exceeds the threshold is based at least in part on one or more authorizations for the mobile station to communicate with one or more networks associated with the subset of wireless transmitters.

12. The method of claim 7, wherein the threshold comprises a BSA information size threshold based on BSA information size.

13. The method of claim 7, wherein the threshold comprises a likelihood threshold.

14. A computing platform for developing almanac information, the computing platform comprising:
   a transceiver; and
   a processor, coupled to the transceiver, wherein the processor:
      determines a subset of wireless transmitters from a plurality of wireless transmitters, based, at least in part, on a proximity to a route of a mobile station and an expected contribution for each of the plurality of wireless transmitters; and
      identifies the almanac information for the subset of wireless transmitters.

15. The computing platform of claim 14, wherein the route comprises a predicted route.

16. The computing platform of claim 14, wherein the processor further transmits from a communication interface of an almanac server, to the mobile station, one or more signals indicative of the almanac information for the subset of wireless transmitters, wherein the one or more signals indicative of the almanac information fit within a specified maximum transmission size.

17. An apparatus for developing almanac information, the apparatus comprising:
   means for determining a subset of wireless transmitters from a plurality of wireless transmitters, based, at least in part, on a proximity to a route of a mobile station and an expected contribution for each of the plurality of wireless transmitters; and
   means for identifying the almanac information for the subset of wireless transmitters.

18. The apparatus of claim 17, wherein the route comprises a predicted route.

19. The apparatus of claim 17, further comprising means for transmitting from a communication interface of an almanac server, to the mobile station, one or more signals indicative of the almanac information for the subset of wireless transmitters, wherein the one or more signals indicative of the almanac information fit within a specified maximum transmission size.

20. The apparatus of claim 17, wherein the expected contribution is based, at least in part, on one or more of:
   a ranging capability,
   an expected measurement accuracy,
   an expected observation accuracy,
   a coverage area size, and
   information related to an importance in past navigation operations.

21. The apparatus of claim 20, wherein the means for determining the subset of wireless transmitters comprises means for determining a likelihood of having the one or more signals acquired by the mobile station for the subset of wireless transmitters based, at least in part, on whether the likelihood exceeds a threshold.

22. The apparatus of claim 21, wherein the means for determining the likelihood of having the one or more signals acquired by the mobile station for the subset of wireless transmitters exceeds the threshold is based at least in part on one or more of:
   a proximity of the subset of wireless transmitters to the mobile station,
   a predicted route of the mobile station, or
   one or more historical routes traveled by the mobile station.

23. The apparatus of claim 21, wherein the means for determining the likelihood of having the one or more signals acquired by the mobile station for the subset of wireless transmitters exceeds the threshold is based at least in part on a number of occurrences over a period of time of past acquisitions of signals from the subset of wireless transmitters by the mobile station.

24. The apparatus of claim 21, wherein the means for determining the likelihood of having the one or more signals acquired by the mobile station for the subset of wireless transmitters exceeds the threshold is based at least in part on one or more of:
   radio access types supported by the mobile station,
   rates of use of the radio access types supported by the mobile station, and
   a radio access type currently enabled by the mobile station.

25. The apparatus of claim 21, wherein the means for determining the likelihood of having the one or more signals acquired by the mobile station for the subset of wireless transmitters exceeds the threshold is based at least in part on one or more authorizations for the mobile station to communicate with one or more networks associated with the subset of wireless transmitters.

26. The apparatus of claim 21, wherein the threshold comprises a BSA information size threshold based on BSA information size.

27. The apparatus of claim 21, wherein the threshold comprises a likelihood threshold.

28. A non-transitory computer-readable medium including program code stored thereon, comprising:
   program code to determine a subset of wireless transmitters from a plurality of wireless transmitters, based, at least in part, on a proximity to a route of a mobile station and an expected contribution for each of the plurality of wireless transmitters; and
   program code to identify almanac information for the subset of wireless transmitters.

* * * * *